US008850873B2

(12) United States Patent
Itoh et al.

(10) Patent No.: US 8,850,873 B2
(45) Date of Patent: Oct. 7, 2014

(54) EVAPORATED FUEL LEAK DETECTING APPARATUS

(75) Inventors: Tomohiro Itoh, Nagoya (JP); Mitsuyuki Kobayashi, Gamagori (JP); Shinji Sugihara, Mizuho (JP)

(73) Assignee: Denso Corporation, Kariya (JP)

( * ) Notice: Subject to any disclaimer, the term of this patent is extended or adjusted under 35 U.S.C. 154(b) by 191 days.

(21) Appl. No.: 13/546,052

(22) Filed: Jul. 11, 2012

(65) Prior Publication Data

US 2013/0014563 A1 Jan. 17, 2013

(30) Foreign Application Priority Data

Jul. 14, 2011 (JP) ................................ 2011-155559

(51) Int. Cl.
*G01M 3/32* (2006.01)
*G01M 3/26* (2006.01)
*F02M 25/08* (2006.01)

(52) U.S. Cl.
CPC ............ *F02M 25/08* (2013.01); *F02M 25/089* (2013.01); *F02M 25/0818* (2013.01); *F02M 25/0827* (2013.01)
USPC ................................................ 73/47; 73/49.7

(58) Field of Classification Search
CPC ....... G01M 3/26; G01M 3/226; G01M 3/025; G01M 3/3263; G01M 3/32; F02D 41/0032; F02D 19/0623; F02D 2041/224; F02D 2041/225
USPC .................................................... 73/40–49.8
See application file for complete search history.

(56) References Cited

U.S. PATENT DOCUMENTS 5,295,472 A 3/1994 Otsuka et al.
5,327,873 A 7/1994 Ohuchi et al.
5,333,589 A * 8/1994 Otsuka .......................... 123/520
5,616,836 A * 4/1997 Blomquist et al. ......... 73/114.39
5,679,890 A * 10/1997 Shinohara et al. ......... 73/114.39
5,996,400 A * 12/1999 Nishioka et al. ........... 73/40.5 R
6,016,690 A * 1/2000 Cook et al. ..................... 73/49.2
6,148,803 A * 11/2000 Majima et al. ................ 123/520
6,343,505 B1 * 2/2002 Cook et al. ................. 73/114.39
6,405,718 B1 * 6/2002 Yoshioka et al. ............. 123/520
6,557,401 B2 * 5/2003 Ito ............................. 73/114.39
6,651,491 B2 * 11/2003 Saito et al. ................. 73/114.38
6,701,777 B2 * 3/2004 Yamaguchi et al. ........... 73/49.7

(Continued)

FOREIGN PATENT DOCUMENTS

JP 5-223018 8/1993
JP 11-030157 2/1999

(Continued)

*Primary Examiner* — David A Rogers
(74) *Attorney, Agent, or Firm* — Nixon & Vanderhye PC

(57) ABSTRACT

A first determiner determines whether a pressure in a fuel tank is within a predetermined range when an ignition switch of an engine is on. A second determiner determines whether a valve allows or prohibits a communication between the fuel tank and a switch valve, when the first determiner determines that the pressure in the fuel tank is within the predetermined range. A control unit controls a pressure controlling portion based on a determination result of the first determiner and a determination result of the second determiner. A leak determiner determines whether the fuel tank has a leak of evaporated fuel based on a signal output from a first detector detecting a pressure in a detection passage and a signal output from a second detector detecting a pressure in the fuel tank.

7 Claims, 6 Drawing Sheets

(56) References Cited

U.S. PATENT DOCUMENTS

| | | | | |
|---|---|---|---|---|
| 6,761,154 | B2 * | 7/2004 | Takagi et al. | 123/520 |
| 6,807,851 | B2 * | 10/2004 | Wakahara et al. | 73/114.39 |
| 6,892,712 | B2 | 5/2005 | Miwa et al. | |
| 7,231,813 | B2 * | 6/2007 | Kato et al. | 73/47 |
| 7,360,401 | B2 * | 4/2008 | Kano | 73/47 |
| 7,448,367 | B1 * | 11/2008 | Reddy et al. | 123/520 |
| 7,594,427 | B2 * | 9/2009 | Ardash | 73/49.7 |
| 7,762,126 | B2 * | 7/2010 | Shibuya | 73/114.39 |
| 8,019,525 | B2 * | 9/2011 | DeBastos et al. | 701/102 |
| 8,033,271 | B2 * | 10/2011 | Yoshimura | 123/520 |
| 8,155,917 | B2 * | 4/2012 | Maegawa | 702/140 |
| 8,560,167 | B2 * | 10/2013 | Jentz et al. | 701/32.7 |
| 2005/0011499 | A1 * | 1/2005 | Hara et al. | 123/520 |
| 2005/0044931 | A1 * | 3/2005 | Ohhashi et al. | 73/46 |
| 2006/0086343 | A1 | 4/2006 | Suzuki | |
| 2009/0148329 | A1 | 6/2009 | Kobayashi et al. | |
| 2009/0211340 | A1 * | 8/2009 | Wang et al. | 73/40.7 |
| 2009/0277251 | A1 * | 11/2009 | Takakura | 73/40.7 |
| 2010/0229966 | A1 * | 9/2010 | Elwart et al. | 137/485 |
| 2011/0295482 | A1 * | 12/2011 | Pearce et al. | 701/102 |

FOREIGN PATENT DOCUMENTS

| | | |
|---|---|---|
| JP | 2004-293438 | 10/2004 |
| JP | 2004-301027 | 10/2004 |
| JP | 2006-118473 | 5/2006 |
| JP | 2007-107502 | 4/2007 |
| JP | 2007-192142 | 8/2007 |

* cited by examiner

EVAPORATED FUEL LEAK DETECTING APPARATUS

CROSS REFERENCE TO RELATED APPLICATION

This application is based on Japanese Patent Application No. 2011-155559 filed on Jul. 14, 2011, the disclosure of which is incorporated herein by reference in its entirety.

TECHNICAL FIELD

The present disclosure relates to an evaporated fuel leak detecting apparatus.

BACKGROUND

An evaporated fuel leak detecting apparatus detects leak of fuel evaporated from a fuel tank or a canister. JP-A-11-30157 describes a system controlling internal pressure of a fuel tank. If it is determined that there is a leak of evaporated fuel, the system closes a valve disposed between the fuel tank and a canister so as to determine whether the leak of evaporated fuel is generated in the fuel tank or components other than the fuel tank.

The system detects the leak of evaporated fuel when the internal pressure of the fuel tank is stable in the state where an ignition switch of an engine of a vehicle is off. The number of times that the detecting of the leak can be conducted is small if the ignition switch is hardly turned off. Further, the system conducts the detecting of the leak by driving a pump that decompresses the fuel tank after a predetermined time period is elapsed when the ignition switch is turned off, so that the system requires electricity for driving the pump and a soak timer that counts the elapsed time period.

SUMMARY

According to an example of the present disclosure, an evaporated fuel leak detecting apparatus that detects a leak of fuel evaporated in a fuel tank storing fuel to be supplied to an internal combustion engine by generating a pressure difference between an inside and an outside of the fuel tank includes: an ignition switch of the combustion engine; a main passage communicating with the fuel tank; a detection passage, an atmospheric passage; a switch valve; a pressure controlling portion; a passage valve; a bypass passage; a throttle; a first detector; a second detector; a first determiner; a second determiner; a control unit; and a leak determiner. The detection passage is configured to communicate with the main passage. The atmospheric passage has a first end configured to communicate with the main passage and a second end released to atmospheric air. The switch valve selectively switches the main passage to communicate with the detection passage or the atmospheric passage. The pressure controlling portion is disposed in the detection passage, and compresses or decompresses inside of the fuel tank when the switch valve causes the main passage to communicate with the detection passage. The passage valve is disposed in the main passage to allow or prohibit a communication between the fuel tank and the switch valve. The passage valve outputs a signal corresponding to a communication state between the fuel tank and the switch valve. The bypass passage causes the main passage to communicate with the detection passage by bypassing the switch valve. The throttle is arranged in the bypass passage. The first detector detects a pressure in the detection passage and outputs a signal corresponding to the pressure detected in the detection passage. The second detector detects a pressure in the fuel tank and outputs a signal corresponding to the pressure detected in the fuel tank. The first determiner determines whether the pressure in the fuel tank is within a predetermined range based on the signal output from the second detector when the ignition switch is on. The second determiner determines whether the passage valve allows or prohibits the communication between the fuel tank and the switch valve, when the first determiner determines that the pressure in the fuel tank is within the predetermined range and when the ignition switch is on. The control unit controls the pressure controlling portion based on a determination result of the first determiner and a determination result of the second determiner. The leak determiner determines whether the fuel tank has the leak of evaporated fuel based on the signal output from the first detector and the signal output from the second detector.

BRIEF DESCRIPTION OF THE DRAWINGS

The above and other objects, features and advantages of the present disclosure will become more apparent from the following detailed description made with reference to the accompanying drawings. In the drawings:

FIG. 2 is a flowchart illustrating a process detecting evaporated fuel leak conducted by the evaporated fuel leak detecting apparatus of the first embodiment in a state where an ignition switch is on;

FIG. 6 is a flowchart illustrating a process detecting evaporated fuel leak conducted by the evaporated fuel leak detecting apparatus of the second embodiment in a state where an ignition switch is on;

DETAILED DESCRIPTION

First Embodiment

Figure 1:
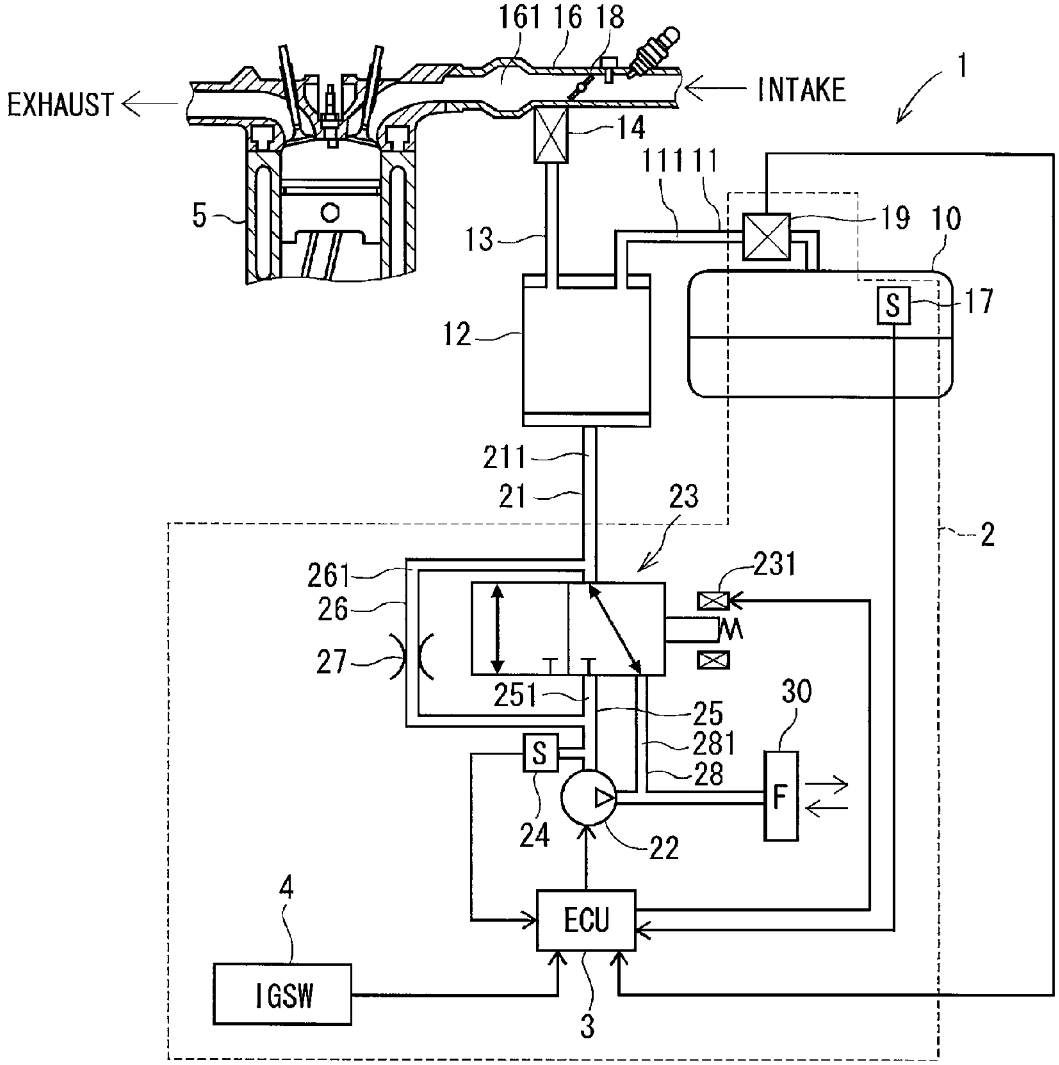
FIG. 1 is a schematic view illustrating an evaporated fuel leak detecting apparatus according to a first embodiment.

An evaporated fuel leak detecting apparatus 2 according to a first embodiment is applied to an evaporated fuel treat system 1 shown in FIG. 1. As shown in FIG. 1, the treat system 1 includes a fuel tank 10, a canister 12, and the detecting apparatus 2. The fuel tank 10 and the canister 12 are connected with each other through a first purge pipe 11. The first purge pipe 11 defines a first purging passage 111 as a main passage. A passage valve 19 is arranged in the first purge pipe 11, and controls a connection state between the fuel tank 10 and the canister 12.

The canister 12 is connected to an intake pipe 16 through a second purge pipe 13. A purge valve 14 is disposed in the second purge pipe 13. Fuel evaporated in the fuel tank 10 is adsorbed by an adsorption material in the canister 12 through the first purging passage 111. The intake pipe 16 defines an intake passage 161, and a throttle valve 18 is arranged in the intake passage 161. The purge valve 14 is a solenoid valve, and an amount of the evaporated fuel purged to a downstream of the throttle valve 18 from the canister 12 is adjusted by controlling the opening degree of the purge valve 14. The fuel purged to the intake passage 161 is introduced into an engine 5.

A pressure sensor 17 is disposed in the fuel tank 10, and detects an internal pressure Pt of the fuel tank 10. The pressure sensor 17 outputs a signal corresponding to the detected pressure. The output signal is input into an electronic control unit (ECU) 3. The pressure sensor 17 may correspond to a second detector detecting a pressure in the fuel tank 10 and outputting a signal corresponding to the pressure detected in the fuel tank 10.

The evaporated fuel leak detecting apparatus 2 and the canister 12 are connected with each other through a canister pipe 21 which defines a canister passage 211. The canister passage 211 may correspond to the main passage together with the first purging passage 111. The evaporated fuel leak detecting apparatus 2 has a decompressing pump 22 as a pressure controlling portion, a switch valve 23, a pressure sensor 24, a bypass pipe 26 bypassing the switch valve 23, a reference orifice 27, and an atmospheric pipe 28. The evaporated fuel leak detecting apparatus 2 detects a leak of fuel evaporated in the fuel tank 10.

The decompressing pump 22 is connected to the switch valve 23 through a pump pipe 25, and the pressure sensor 24 is disposed in a pump passage 251 defined in the pump pipe 25. The decompressing pump 22 decompresses the inside of the fuel tank 10 through the pump passage 251, the switch valve 23, the canister passage 211, and the first purging passage 111. The passages 251, 211, and 111 may correspond to a detection passage. The pump pipe 25 is connected with a bypass pipe 26 that bypasses the switch valve 23, and the reference orifice 27 is disposed in the bypass pipe 26.

The switch valve 23 is a solenoid valve. As shown in FIG. 1, the switch valve 23 causes the canister passage 211 and an atmospheric passage 281 defined in the atmospheric pipe 28 to communicate with each other when electricity is not supplied to a coil 231 of the switch valve 23. Thereby, the inside of the canister 12 communicates with atmospheric air.

When electricity is started to be supplied to the coil 231, the inside of the canister 12 and the decompressing pump 22 communicate with each other through the switch valve 23 (not through the bypass passage 261). The pressure sensor 24 arranged in the pump pipe 25 detects a pressure P in the pump passage 251. The reference orifice 27 arranged in the bypass pipe 26 has a hole corresponding to an upper limit of permissible amount of air leak containing fuel evaporated from the fuel tank 10.

A filter 30 is disposed at the end of the atmospheric pipe 28. When the canister 12 adsorbs the evaporated fuel, or when the decompressing pump 22 decompresses the inside of the fuel tank 10, air in the canister 12 or the fuel tank 10 is released to atmospheric air through the filter 30.

In contrast, when the fuel adsorbed by the canister 12 is sent into the intake pipe 16 or when a basis pressure is detected in a process detecting leak of evaporated fuel, atmospheric air is introduced into the detecting apparatus 2 through the filter 30. At this time, the filter 30 collects foreign matters contained in the introduced air. In addition, arrow directions shown near the filter 30 in FIG. 1 represent flow of the air.

The ECU 3 is constructed of a microcomputer having a CPU corresponding to a calculator, a ROM and a RAM corresponding to a memory. The ECU 3 is electrically connected with the pressure sensors 17 and 24, the passage valve 19, the decompressing pump 22, the coil 231, and an ignition switch 4 of the engine 5. The ECU 3 receives a signal according to the internal pressure Pt of the fuel tank 10 detected by the pressure sensor 17 and a signal according to the pressure P of the detection passage 251 detected by the pressure sensor 24.

Moreover, the ECU 3 receives a signal according to the open/close state of the passage valve 19 from the passage valve 19 and a signal according to the on/off state of the ignition switch 4 from the ignition switch 4. The ECU 3 outputs a signal that controls a driving of the decompressing pump 22, and a signal that controls an energizing of the coil 231.

The ECU 3 may correspond to a first determiner determining whether the pressure in the fuel tank 10 is within a predetermined range; a second determiner determining whether the passage valve 19 allows or prohibits the connection between the fuel tank 10 and the switch valve 23; a control unit that controls the pressure controlling portion based on a determination result of the first determiner and a determination result of the second determiner; and a leak determiner that determines whether the fuel tank 10 has the leak of evaporated fuel based on the signal output from the first detector and the signal output from the second detector.

Operations of the evaporated fuel leak detecting apparatus 2 of the first embodiment will be described with reference to FIGS. 2 and 3. The evaporated fuel leak detecting apparatus 2 detects leak of fuel evaporated from the fuel tank 10 and the canister 12. A process of detecting the leak of the evaporated fuel (hereinafter referred as the detecting process) performed by the apparatus 2 will be explained using the flowchart of FIGS. 2 and 3.

Figure 2:
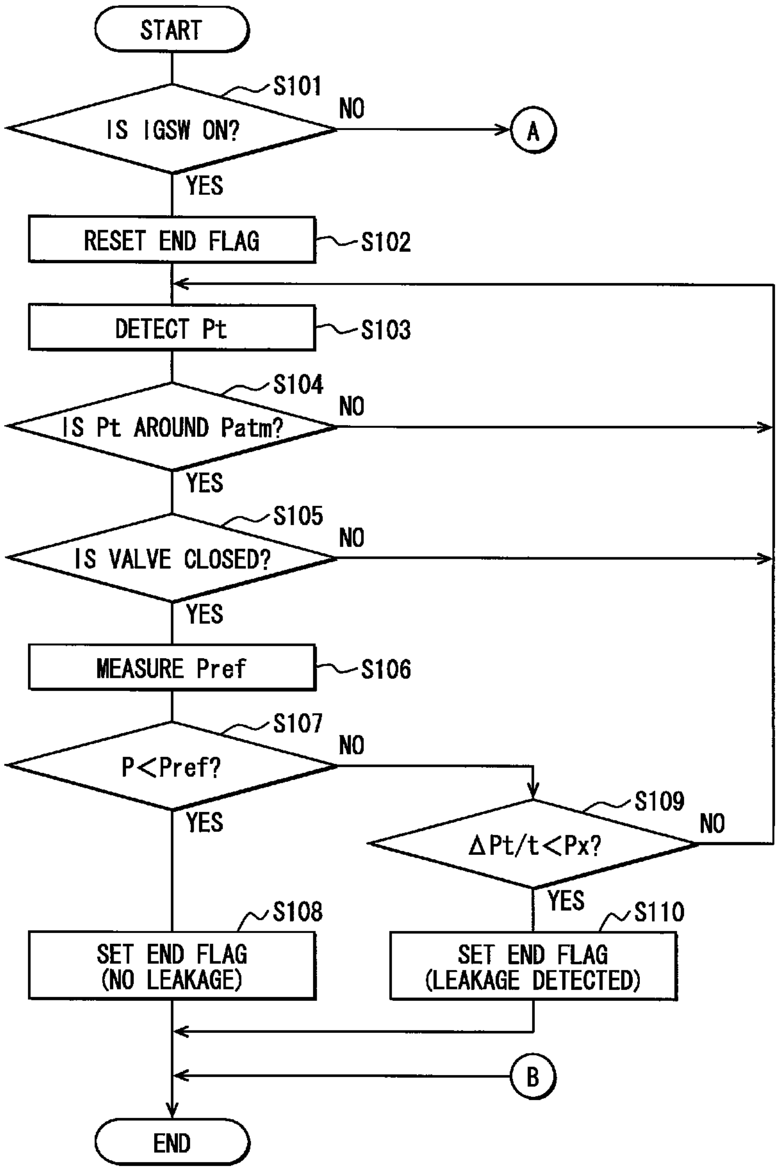

At S101 of FIG. 2, the ECU 3 determines whether the ignition switch 4 of the vehicle is on or not based on the signal output from the ignition switch 4 that is electrically connected with the ECU 3. When the ignition switch 4 is active (on), the detecting process shifts to S102. When the ignition switch 4 is not active (i.e., when the ignition switch 4 is off, so that the engine of the vehicle is stopped), the detecting process shifts to S111 of FIG. 3.

At S102, the ECU 3 resets an end flag, which was set when the last detecting process was completed.

At S103, the internal pressure Pt of the fuel tank 10 is detected by the pressure sensor 17. The pressure sensor 17 detects the internal pressure Pt of the fuel tank 10 during a predetermined period such as one minute.

At S104, the ECU 3 determines whether the internal pressure Pt of the fuel tank 10 is near an atmospheric pressure Patm. Specifically, the ECU 3 determines whether the internal pressure Pt is within a predetermined pressure range based on the internal pressure Pt detected in S103. When the internal pressure Pt is around an atmospheric pressure Patm, the detecting process shifts to S105. When the internal pressure Pt is not near an atmospheric pressure Patm, the detecting process returns to S103 and the internal pressure Pt is detected.

At S105, the ECU 3 determines whether the passage valve 19 is closed while the internal pressure Pt of the fuel tank 10 is detected in S103. Even when the internal pressure Pt is determined to be near an atmospheric pressure in S104, the internal pressure Pt may not be stable if the passage valve 19 is opened while the internal pressure Pt is detected. The ECU 3 determines the passage valve 19 to be opened or closed based on the signal output from the passage valve 19 according to the open/close state of the passage valve 19. If the passage valve 19 is in the closed state while the internal pressure Pt is detected, the detecting process shifts to S106. If the passage valve 19 is not in the closed state while the internal pressure Pt is detected, the detecting process returns to S103 and the internal pressure Pt is detected.

At S106, the basis pressure Pref is measured as a comparison value used for detecting the leak of evaporated fuel. In S106, electricity supply is started for the decompressing pump 22, so that the detection passage 251 is decompressed. Thereby, air flowing from the atmospheric passage 281 flows into the detection passage 251 via the bypass passage 261. The flow of the air flowing into the detection passage 251 is throttled by the reference orifice 27 of the bypass passage 261. Therefore, the pressure of the detection passage 251 becomes fixed after declining to a predetermined pressure corresponding to the opening degree of the reference orifice 27. The pressure of the detection passage 251 detected by the pressure sensor 24 is recorded in the ECU 3 as the basis pressure Pref shown in FIG. 4A. The basis pressure Pref is lower than an atmospheric pressure Patm. When the detection of the basis pressure Pref is completed, electricity supply to the decompressing pump 22 is stopped. In addition, the passage valve 19 is still in the closed state at this time.

At S107, the inside of the fuel tank 10 is decompressed, and the ECU 3 determines whether the pressure P of the detection passage 251 detected by the pressure sensor 24 is lower than the basis pressure Pref (P<Pref?). In S107, the coil 231 of the switch valve 23 is energized. Thereby, the atmospheric passage 281 and the canister passage 211 are disconnected from each other, and the canister passage 211 and the detection passage 251 are connected to communicate with each other. When the canister passage 211 and the detection passage 251 are made to communicate with each other, the decompressing pump 22 is operated. At this time, the passage valve 19 is switched into the opened state, so that the inside of the fuel tank 10 communicating with the canister 12 is decompressed. When the operation of the decompressing pump 22 is continued, the pressure P of the detection passage 251 communicating with the fuel tank 10 is detected by the pressure sensor 24.

Figure 4A:
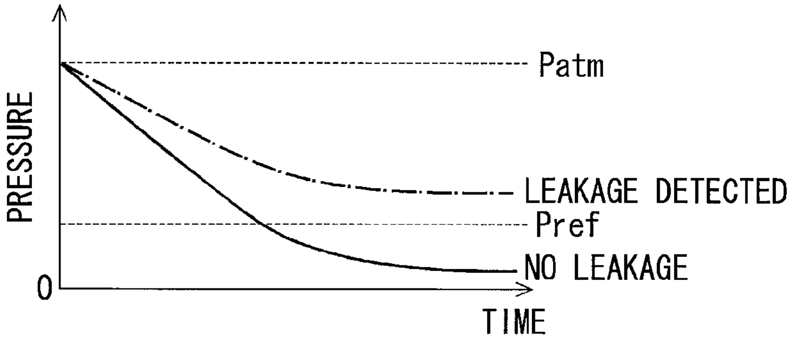
FIG. 4A is a graph illustrating a relationship between a time and a pressure in a detection passage.

If the detected pressure P is lower than the basis pressure Pref detected in S106, it is determined that the leak of air containing fuel evaporated from the fuel tank 10 and the canister 12 is equal to or lower than a permissible level ("no leakage" shown by a continuous line of FIG. 4A). That is, it is determined that there is no air invasion into the inside of the fuel tank 10 and the canister 12 from outside, or that the amount of air invasion is equal to or lower than the flow rate of the reference orifice 27.

If the detected pressure P is equal to or higher than the basis pressure Pref detected in S106, it is determined that the leak of air containing fuel evaporated from the fuel tank 10 and the canister 12 is higher than the permissible level ("leakage detected" shown by a single-chain line of FIG. 4A). That is, it is determined that there is air invasion into the inside of the fuel tank 10 and the canister 12 from outside in accordance with the decompressing of the inside of the fuel tank 10 and the canister 12.

When the pressure P is determined to be lower than the basis pressure Pref in S107, the detecting process shifts to S108. In S108, the detecting process is completed with the conclusion that there is no leak in the evaporated fuel treat system 1, and the end flag is set. When the pressure P is determined to be equal to or higher than the basis pressure Pref, the detecting process shifts to S109.

Figure 4B:
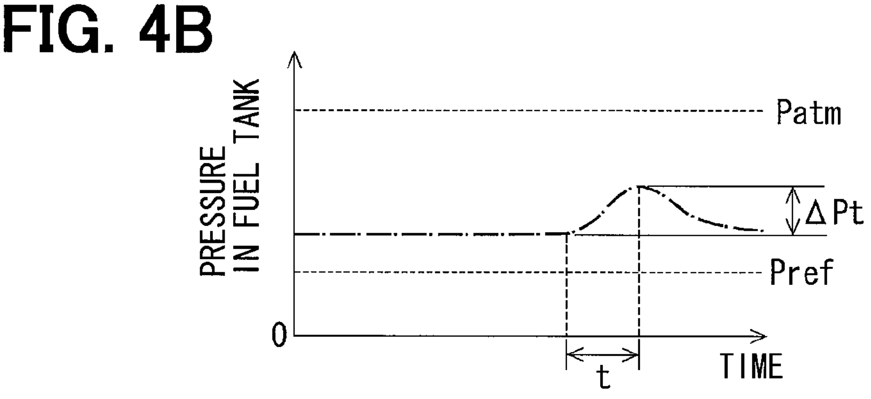
FIG. 4B is a graph illustrating a relationship between a time and a pressure in a fuel tank.

At S109, it is determined whether the inside of the fuel tank 10 is stable or not based on a "pressure variation in the fuel tank 10 per unit time". In FIG. 4B, the pressure in the fuel tank 10 has a variation ΔPt per time t, so that the "pressure variation in the fuel tank 10 per unit time" is defined by ΔPt/t.

In S109, the fuel tank 10 and the canister 12 are disconnected from each other by switching the passage valve 19 into the closed state. At this time, a reference value Px is set for the "pressure variation in the fuel tank 10 per unit time" by the ECU 3.

When the "pressure variation in the fuel tank 10 per unit time" ΔPt/t is equal to or higher than the reference value Px, the inside of the fuel tank 10 may not be stable. It is determined whether the internal pressure Pt of the fuel tank 10 is stable or not based on the relationship between the "pressure variation in the fuel tank 10 per unit time" ΔPt/t and the reference value Px.

When the "pressure variation in the fuel tank 10 per unit time" ΔPt/t is lower than the reference value Px, the detecting process shifts to S110. In S110, the end flag is set to represent that there is a leak of fuel evaporated from the evaporated fuel treat system 1, and the detecting process is ended. In contrast, when the "pressure variation in the fuel tank 10 per unit time" ΔPt/t is equal to or higher than the reference value Px, the detecting process returns to S103 and the internal pressure Pt of the fuel tank 10 is detected.

Figure 3:
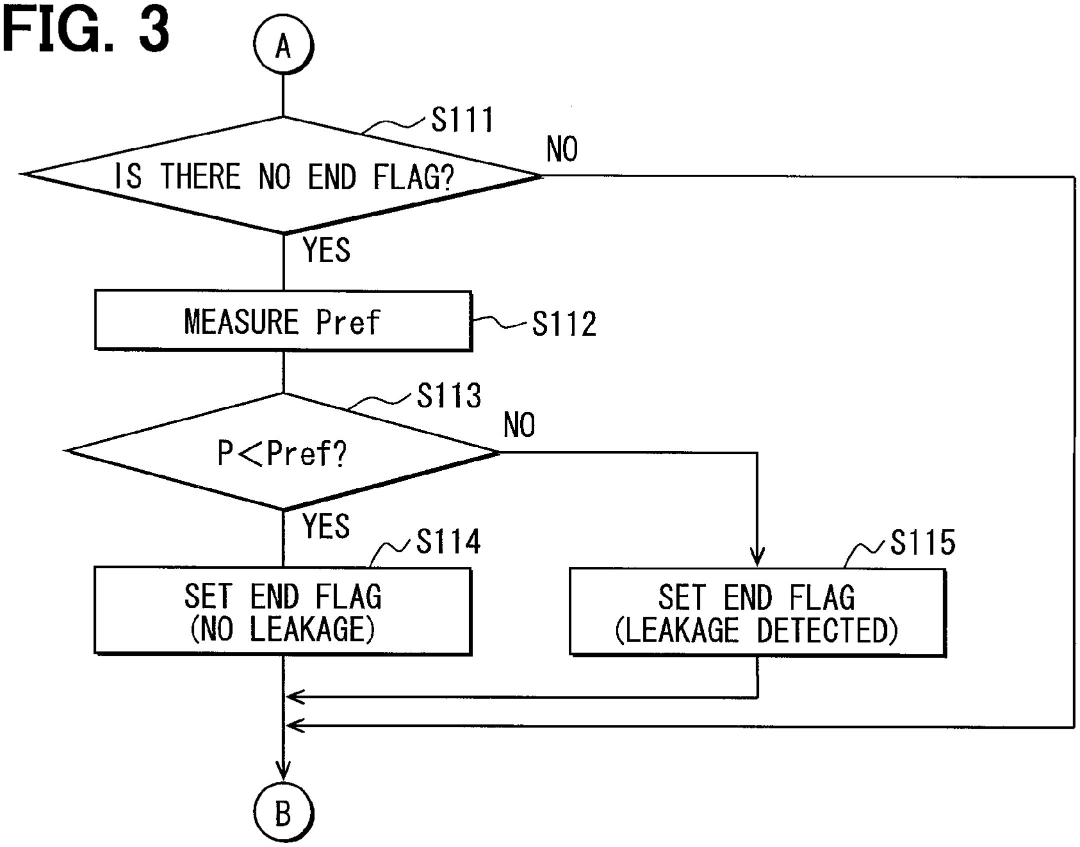
FIG. 3 is a flowchart illustrating a process detecting evaporated fuel leak conducted by the evaporated fuel leak detecting apparatus of the first embodiment in a state where an ignition switch is off.

When the ignition switch 4 is determined to be in the off state in S101, the detecting process shifts to S111 of FIG. 3. The ECU 3 determines whether the end flag is set or not when five hours is elapsed after the ignition switch 4 is turned off. If the end flag is not set, the detecting process shifts to S112. If the end flag is set, the detecting process is ended.

At S112, the basis pressure Pref is measured, similarly to S106. After the basis pressure Pref is measured in S112, the detecting process shifts to S113.

At S113, the inside of the fuel tank 10 and the canister 12 is decompressed, and the ECU 3 determines whether the pressure P detected by the pressure sensor 24 is lower than the basis pressure Pref, similarly to S107. If the pressure P is determined to be lower than the basis pressure Pref in S113, the detecting process shifts to S114. At S114, the end flag is set to represent that there is no leak in the evaporated fuel treat system 1, and the detecting process is ended.

If the pressure P is determined to be equal to or higher than the basis pressure Pref in S113, the detecting process shifts to S115. At S115, the end flag is set to represent that there is a leak in the evaporated fuel treat system 1, and the detecting process is ended.

According to the first embodiment, the evaporated fuel leak detecting process is conducted by the evaporated fuel leak detecting apparatus 2 when the ignition switch 4 is in the on state. However, there is a possibility that an incorrect detection may be conducted if the detecting process is conducted when the pressure in the fuel tank 10 is unstable. Therefore, the evaporated fuel leak detecting apparatus 2 of the first embodiment determines whether the internal pressure Pt of the fuel tank 10 is stable or not using the pressure sensor 17 which detects the internal pressure Pt and the passage valve 19 which allows or prohibits the communication between the fuel tank 10 and the canister 12.

Specifically, after the internal pressure Pt is determined to be stable near an atmospheric pressure, the open/close state of the passage valve 19 is determined in the period during which the internal pressure Pt is detected. At this time, if the passage valve 19 is in the closed state, the fuel tank 10 does not communicate with the canister 12, so that it is estimated that the internal pressure Pt is not affected (varied) by factors other than the fuel tank 10. In contrast, if the passage valve 19 is in the opened state or if the passage valve 19 is repeatedly opened and closed while the internal pressure Pt is detected, it is estimated that the internal pressure Pt is varied by the factors other than the fuel tank 10.

The evaporated fuel leak detecting apparatus 2 conducts the detecting process by determining the internal pressure Pt and the open/close state of the passage valve 19 in the period while the internal pressure Pt is detected after confirming that the pressure in the fuel tank 10 is stable. Thus, the detecting process can be performed also when the ignition switch 4 is in the on state, so that the detecting process can be performed a predetermined or more number of times within a predetermined period.

In a comparison example, a detecting process is conducted when an ignition switch is in the off state. In this case, an evaporated fuel treat system of the comparison example requires electricity for driving a decompressing pump that decompresses a fuel tank and a soak timer that calculates a start time of the detecting process.

However, according to the first embodiment, the evaporated fuel leak detecting apparatus 2 conducts the detecting process after confirming that the pressure in the fuel tank 10 is stable when the ignition switch 4 is in the on state. Thus, the detecting process can be performed a predetermined or more number of times within a predetermined period while the ignition switch 4 is in the on state.

In the first embodiment, it becomes unnecessary to perform the detecting process by turning off the ignition switch 4. Accordingly, the soak timer of the comparison example can be eliminated. Further, the electric power used for driving the decompressing pump becomes unnecessary, so that power consumption can be saved for a power source mounted in the vehicle.

According to the first embodiment, when the internal pressure Pt is equal to or higher than the basis pressure Pref, it is determined whether the internal pressure Pt is stable or not using the pressure sensor 17 by comparing the "pressure variation in the fuel tank 10 per unit time" ΔPt/t and the reference value Px. When the "pressure variation in the fuel tank 10 per unit time" ΔPt/t is equal to or higher than the reference value Px, it is determined that the internal pressure of the fuel tank 10 is unstable, and there is a possibility that an incorrect determination may be conducted in the detecting process. In this case, the detection detecting the leak of the evaporated fuel is prohibited by the evaporated fuel leak detecting apparatus 2.

In contrast, when the "pressure variation in the fuel tank 10 per unit time" ΔPt/t is lower than the reference value Px, it is determined that the internal pressure of the fuel tank 10 is stable, and the evaporated fuel leak detecting apparatus 2 determines that there is a leak of fuel evaporated from the fuel tank 10. Thereby, the detection accuracy can be raised in the detecting process.

Second Embodiment

A second embodiment will be described with reference to FIGS. 5-8B. The second embodiment is different from the first embodiment in the pressure controlling portion which controls the internal pressure of the fuel tank 10. The substantially same parts and components as the first embodiment are indicated with the same reference numeral and the same description will be omitted.

Figure 5:
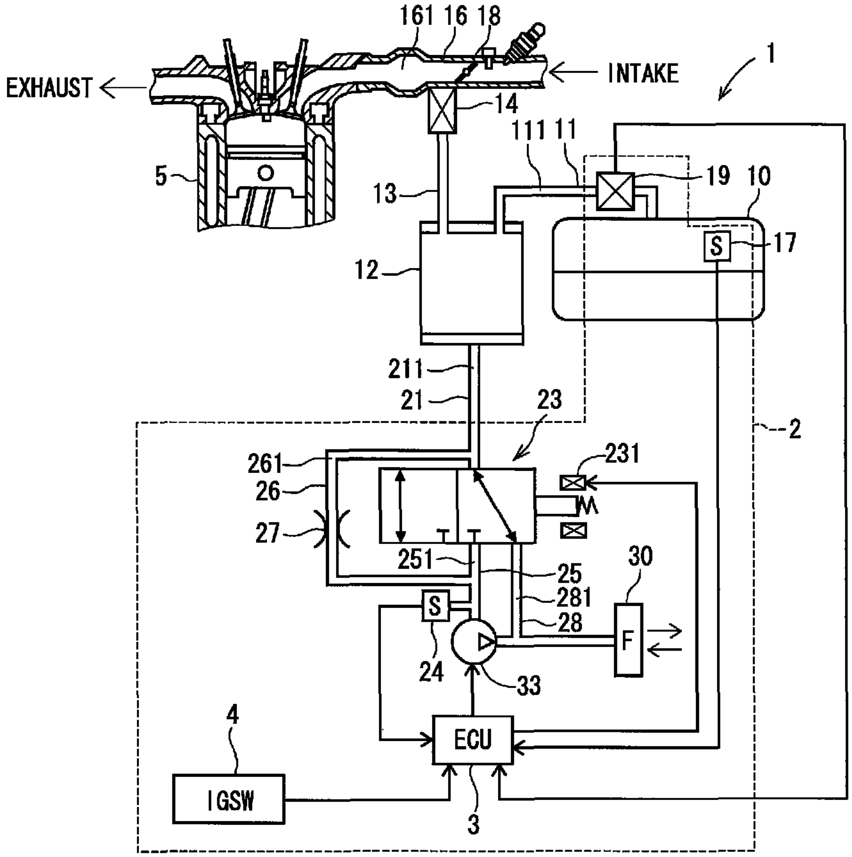
FIG. 5 is a schematic view illustrating an evaporated fuel leak detecting apparatus according to a second embodiment.

The evaporated fuel leak detecting apparatus 2 of the second embodiment includes a compressing pump 33 that pressurizes the inside of the fuel tank 10 as a pressure controlling portion. As shown in FIG. 5, the compressing pump 33 is connected to the pump pipe 25, instead of the decompressing pump 22 of the first embodiment.

Figure 6:
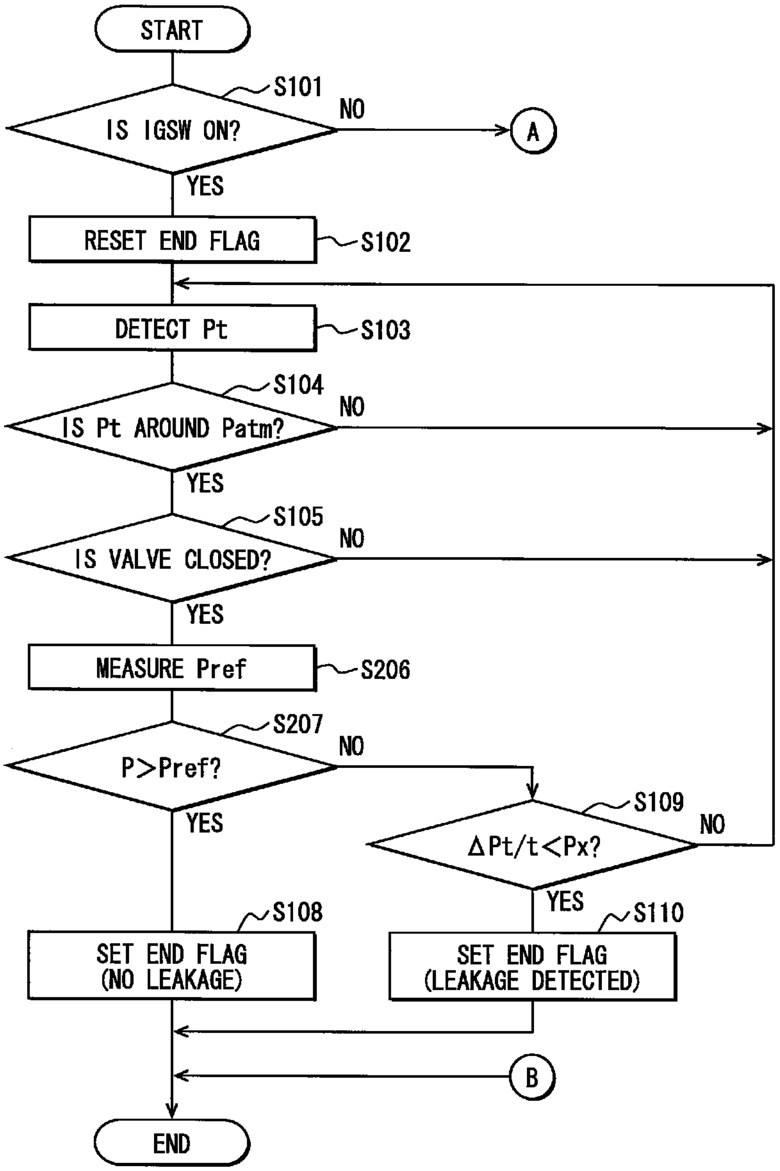
Figure 7:
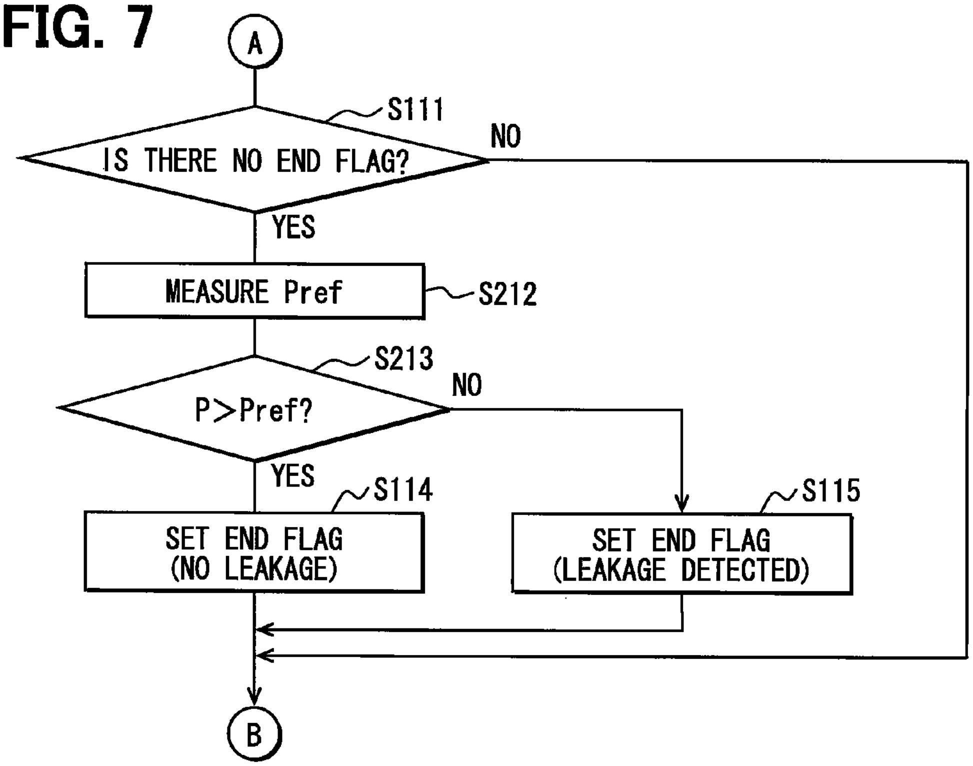
FIG. 7 is a flowchart illustrating a process detecting evaporated fuel leak conducted by the evaporated fuel leak detecting apparatus of the second embodiment in a state where an ignition switch is off.
Figure 8A:
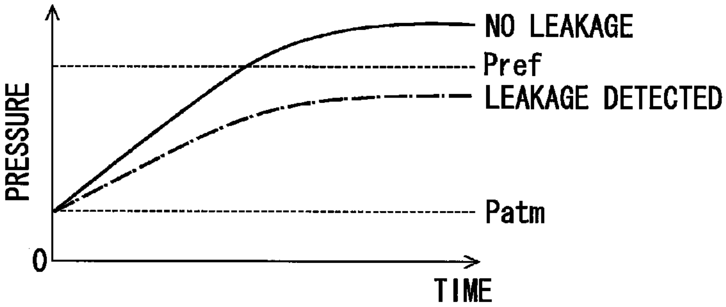
FIG. 8A is a graph illustrating a relationship between a time and a pressure in a detection passage.
Figure 8B:
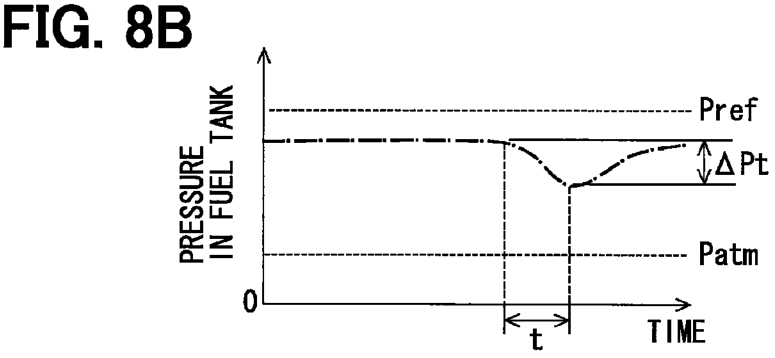
FIG. 8B is a graph illustrating a relationship between a time and a pressure in a fuel tank.

The flowchart of the detecting process according to the second embodiment is shown in FIGS. 6 and 7. As shown in FIG. 6, the basis pressure Pref is detected in S206 that is performed after S105 by pressurizing the detection passage 251 and the bypass passage 261. Thereby, the basis pressure Pref is set as a value higher than an atmospheric pressure Patm, as shown in FIG. 8A.

Moreover, in S207, the pressure P of the detection passage is compared with the basis pressure Pref. The pressure P of the detection passage is detected by compressing the inside of the fuel tank 10 and the canister 12. Thus, as shown in FIG. 8A, when the detected pressure P is equal to or higher than the basis pressure Pref, it is determined that the amount of the air containing the evaporated fuel leaked from the fuel tank 10 and the canister 12 is equal to or lower than a permissible level.

In contrast, when the detected pressure P is lower than the basis pressure Pref, it is determined that the amount of the air containing the evaporated fuel leaked from the fuel tank 10 and the canister 12 is higher than the permissible level. In addition, S212 and S213 of FIG. 7 are conducted similarly to S206 and S207 of FIG. 6.

The advantages of the evaporated fuel leak detecting apparatus 2 of the second embodiment are the same as the first embodiment.

Other Embodiments

The passage valve 19 is disposed in the first purge pipe 11 which connects the fuel tank 10 to the canister 12. However, the position of the passage valve 19 is not limited to this position. The passage valve 19 may be disposed in the canister pipe 21 which connects the canister 12 to the switch valve 23.

The time period necessary for detecting the internal pressure of the fuel tank 10 is one minute. However, the time period is not limited to this period. The time necessary for detecting the internal pressure of the fuel tank 10 may be longer than one minute, or may be shorter than one minute.

The end flag is determined to be set or not when five hours are elapsed after the ignition switch 4 is turned off. However, the time elapsed after turning off the ignition switch 4 is not limited to this time. The time elapsed after turning off the ignition switch 4 may be less than five hours, or may be more than five hours.

The purge valve 14 is arranged at the downstream of the throttle valve 18. However, the position of the purge valve 14 is not limited to this position. The purge valve 14 may be installed at the upstream of the throttle valve 18.

The present disclosure is not limited to the embodiments mentioned above, and can be applied to various embodiments.

While the present disclosure has been described with reference to preferred embodiments thereof, it is to be understood that the disclosure is not limited to the preferred embodiments and constructions. The present disclosure is intended to cover various modification and equivalent arrangements. In addition, while the various combinations and configurations, which are preferred, other combinations and configurations, including more, less or only a single element, are also within the spirit and scope of the present disclosure.

Such changes and modifications are to be understood as being within the scope of the present disclosure as defined by the appended claims.

What is claimed is:

1. An evaporated fuel leak detecting apparatus that detects a leak of fuel evaporated in a fuel tank storing fuel to be supplied to an internal combustion engine by generating a pressure difference between an inside and an outside of the fuel tank, the apparatus comprising:

an ignition switch of the combustion engine;

a main passage communicating with the fuel tank;

a detection passage configured to communicate with the main passage;

an atmospheric passage having a first end configured to communicate with the main passage and a second end released to atmospheric air;

a switch valve that selectively switches the main passage to communicate with the detection passage or the atmospheric passage;

a pressure controlling portion disposed in the detection passage, the pressure controlling portion compressing or decompressing inside of the fuel tank when the switch valve causes the main passage to communicate with the detection passage;

a passage valve disposed in the main passage to allow or prohibit a communication between the fuel tank and the switch valve, the passage valve outputting a signal corresponding to a communication state between the fuel tank and the switch valve;

a bypass passage causing the main passage to communicate with the detection passage by bypassing the switch valve;

a throttle arranged in the bypass passage;

a first detector detecting a pressure in the detection passage and outputting a signal corresponding to the pressure detected in the detection passage;

a second detector detecting a pressure in the fuel tank and outputting a signal corresponding to the pressure detected in the fuel tank;

a first determiner determining whether the pressure in the fuel tank is within a predetermined range based on the signal output from the second detector when the ignition switch is on;

a second determiner determining whether the passage valve allows or prohibits the communication between the fuel tank and the switch valve, when the first determiner determines that the pressure in the fuel tank is within the predetermined range and when the ignition switch is on;

a control unit that controls the pressure controlling portion based on a determination result of the first determiner and a determination result of the second determiner; and a leak determiner that determines whether the fuel tank has the leak of evaporated fuel based on the signal output from the first detector and the signal output from the second detector.

2. The evaporated fuel leak detecting apparatus according to claim 1, wherein the second determiner determines whether the passage valve allows or prohibits the communication between the fuel tank and the switch valve in a period during which the second detector detects the pressure in the fuel tank.

3. The evaporated fuel leak detecting apparatus according to claim 2, wherein the control unit drives the pressure controlling portion when the first determiner determines that the pressure in the fuel tank is within the predetermined range and when the second determiner determines that the passage valve prohibits the communication between the fuel tank and the switch valve in the period.

4. The evaporated fuel leak detecting apparatus according to claim 1, wherein the pressure controlling portion decompresses the inside of the fuel tank when the switch valve causes the main passage to communicate with the detection passage, and the leak determiner determines that the fuel tank has the leak of evaporated fuel when the pressure in the detection passage is equal to or higher than a threshold pressure and when a variation of the pressure in the fuel tank per unit time is determined to be lower than a predetermined value.

5. The evaporated fuel leak detecting apparatus according to claim 1, wherein the pressure controlling portion compresses the inside of the fuel tank when the switch valve causes the main passage to communicate with the detection passage, and the leak determiner determines that the fuel tank has the leak of evaporated fuel when the pressure in the detection passage is lower than a threshold pressure and when a variation of the pressure in the fuel tank per unit time is determined to be lower than a predetermined value.

6. The evaporated fuel leak detecting apparatus according to claim 1, wherein the leak determiner determines the leak of evaporated fuel only when the first determiner determines that the pressure in the fuel tank is stable.

7. The evaporated fuel leak detecting apparatus according to claim 1, wherein the leak determiner determines the leak of evaporated fuel only when the first determiner determines that a pressure variation in the fuel tank per unit time is lower than a reference value.

* * * * *